Oct. 7, 1969
G. B. MORSE
3,470,789
MULTIPLE PURPOSE MACHINE
Filed Feb. 23, 1967
12 Sheets-Sheet 3
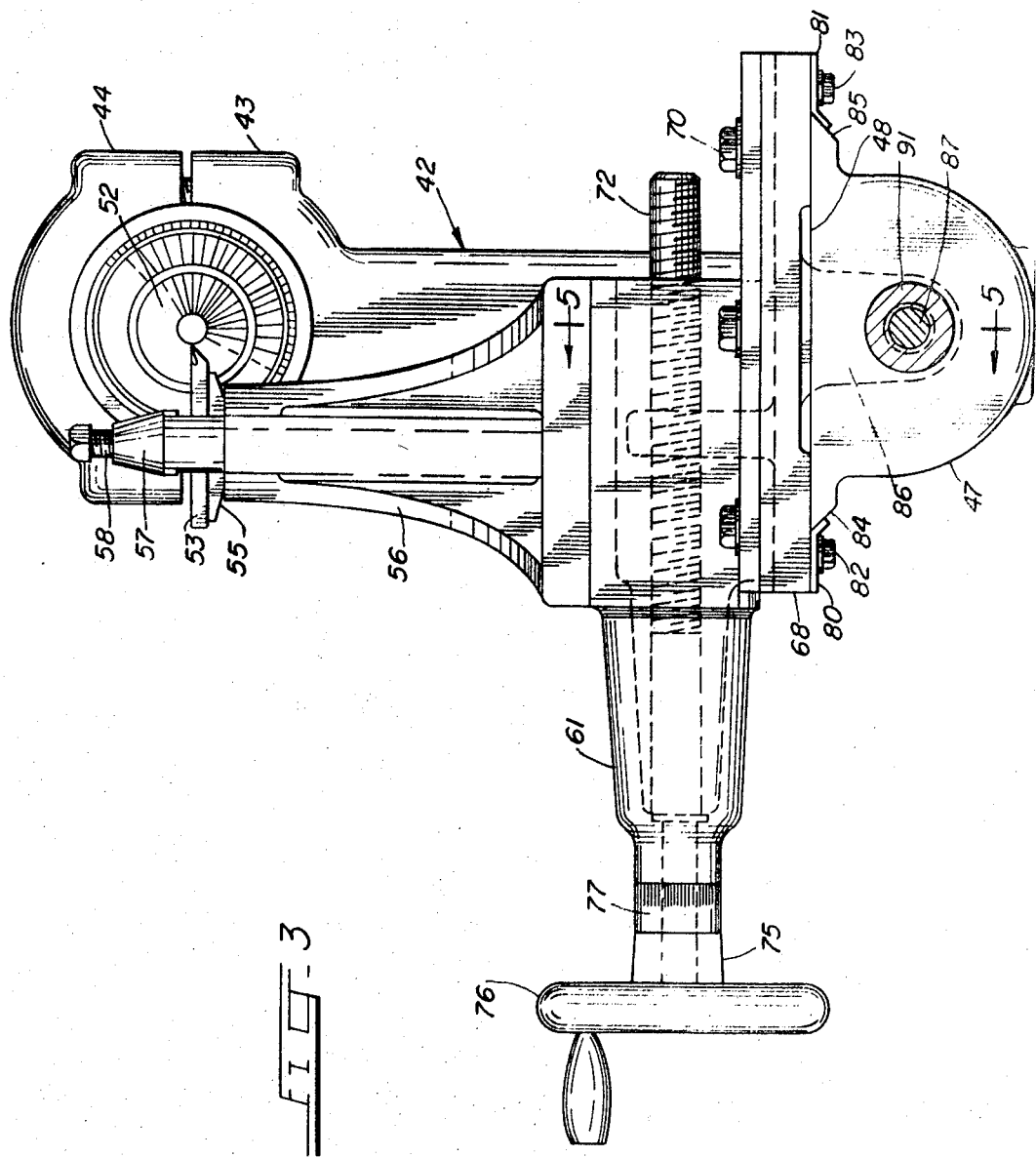
INVENTOR.
GLENN B. MORSE

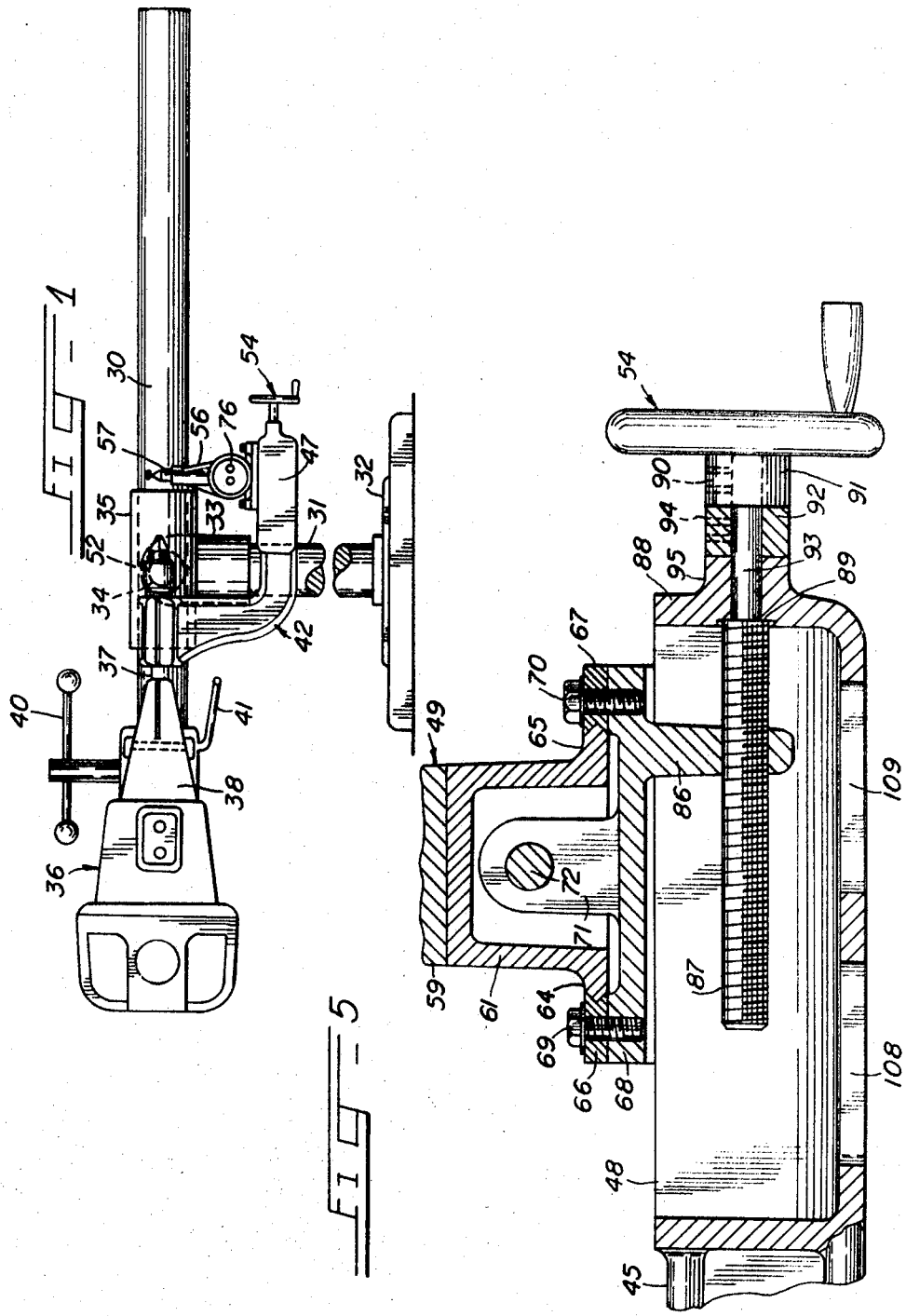

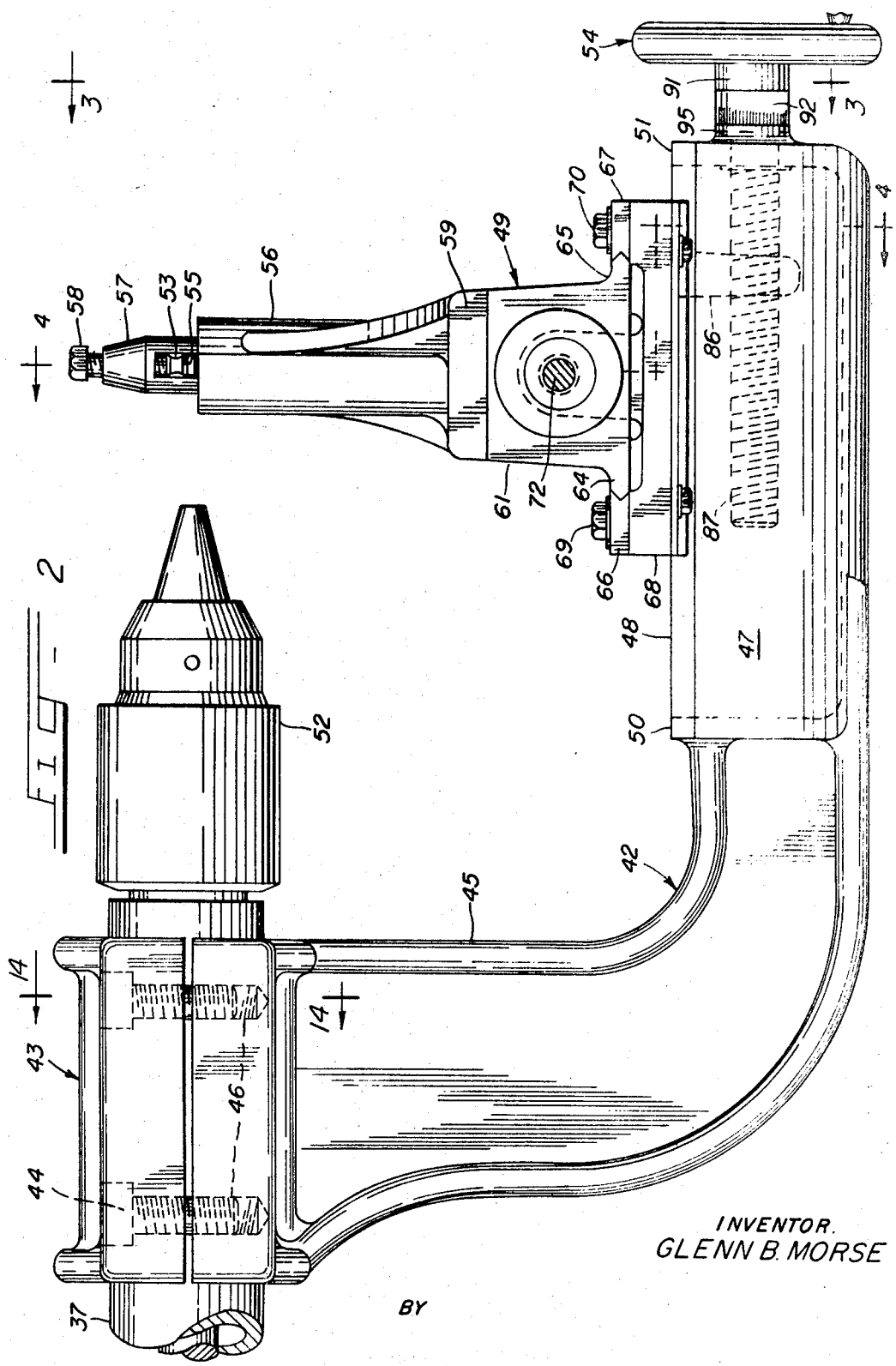

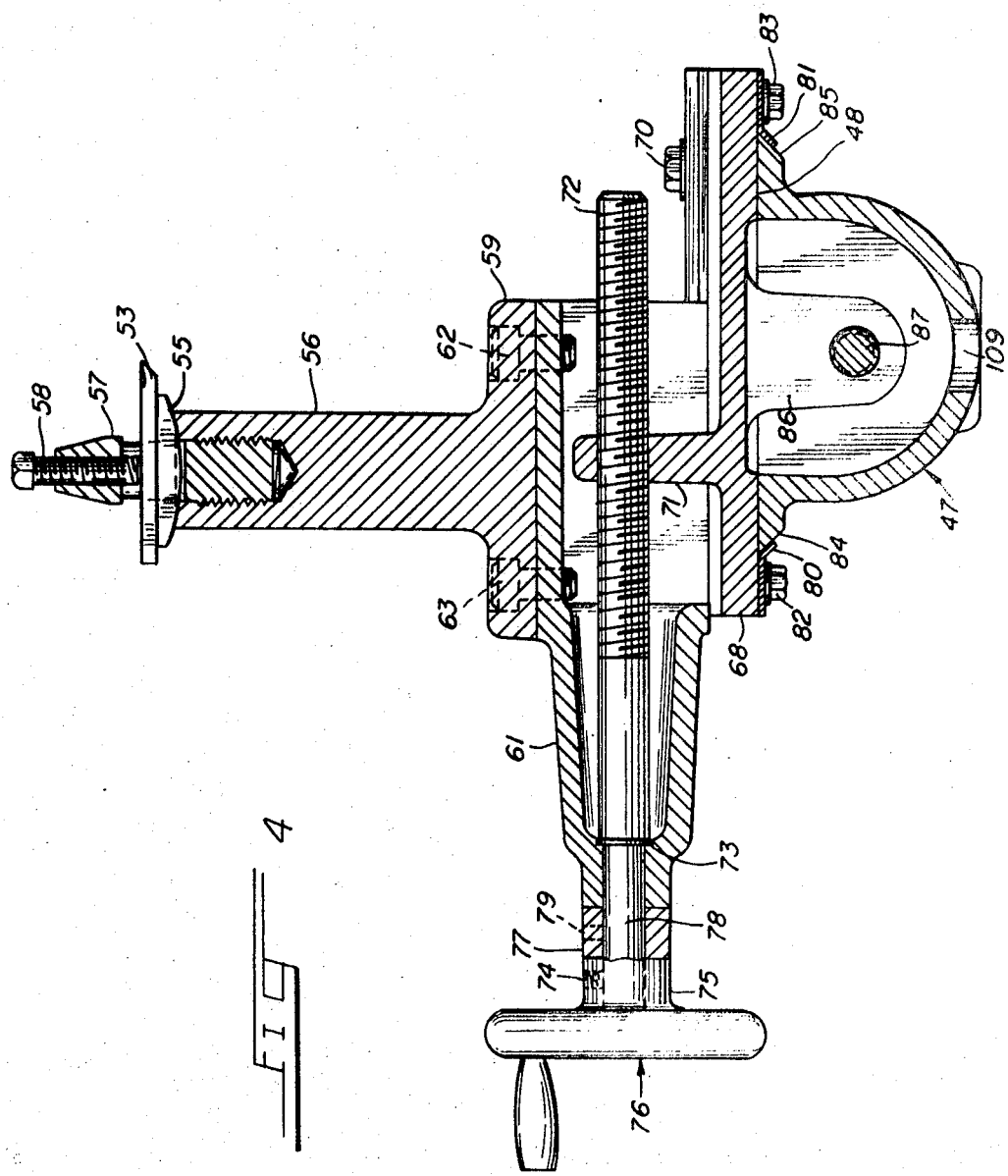

Oct. 7, 1969  G. B. MORSE  3,470,789
MULTIPLE PURPOSE MACHINE
Filed Feb. 23, 1967  12 Sheets-Sheet
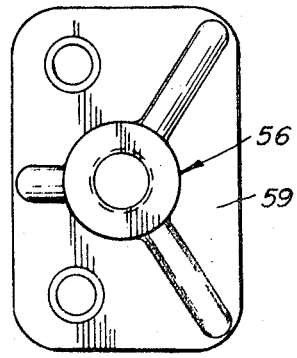
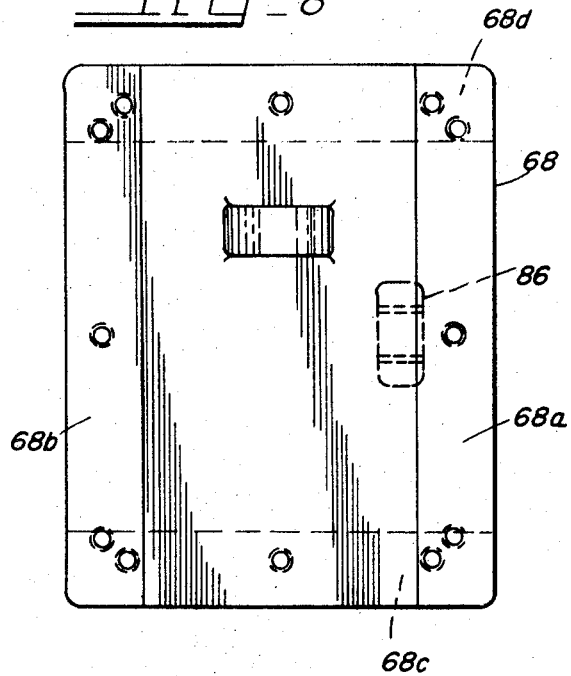
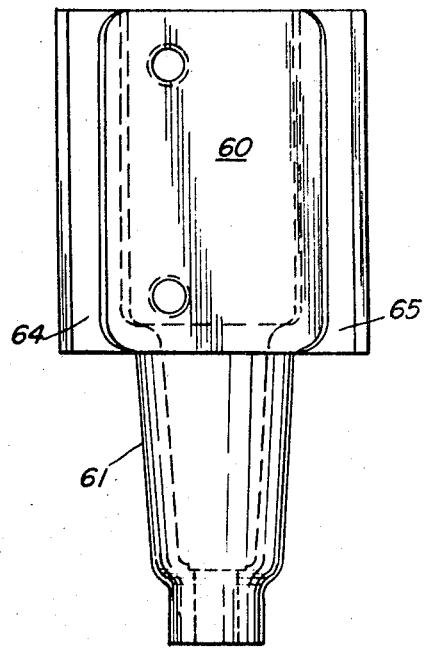
INVENTOR.
GLENN B. MORSE

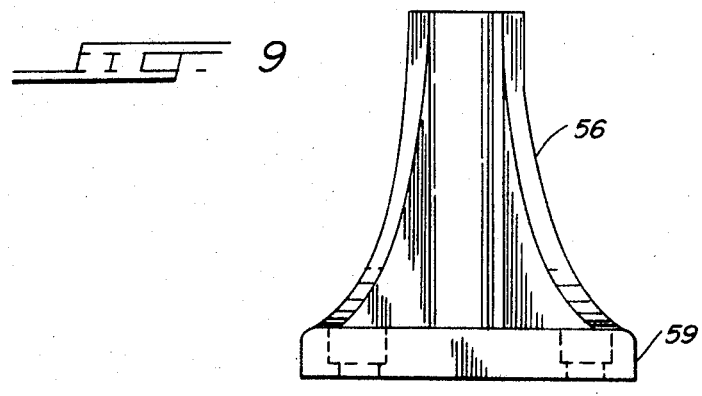
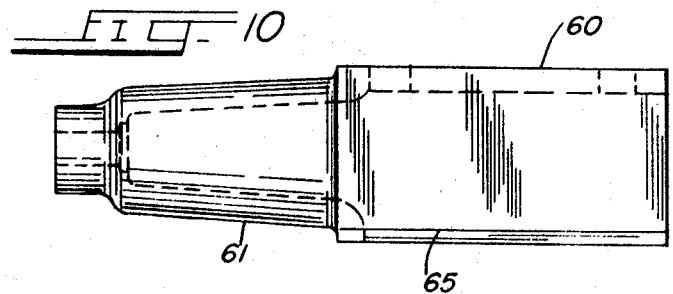
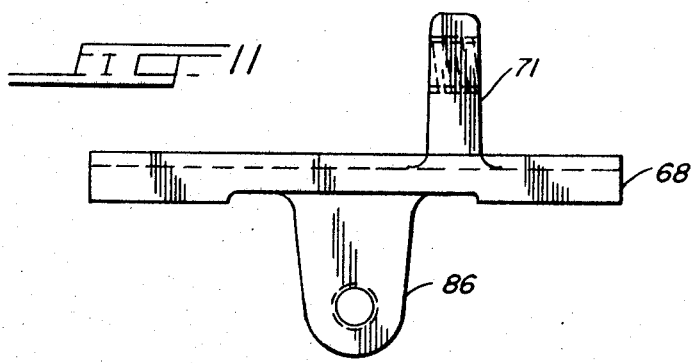

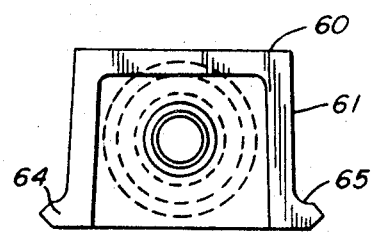
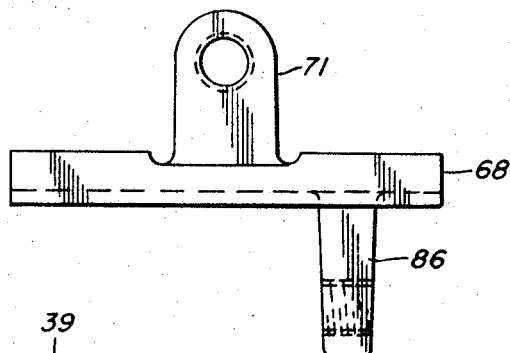
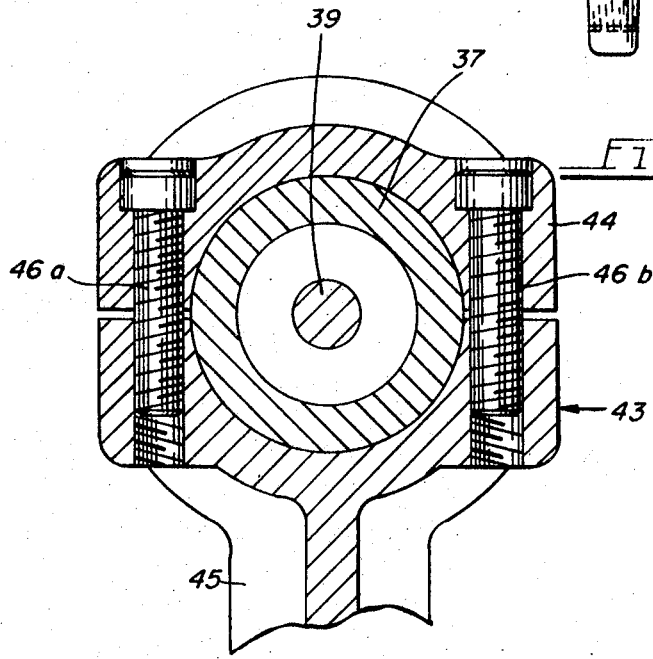

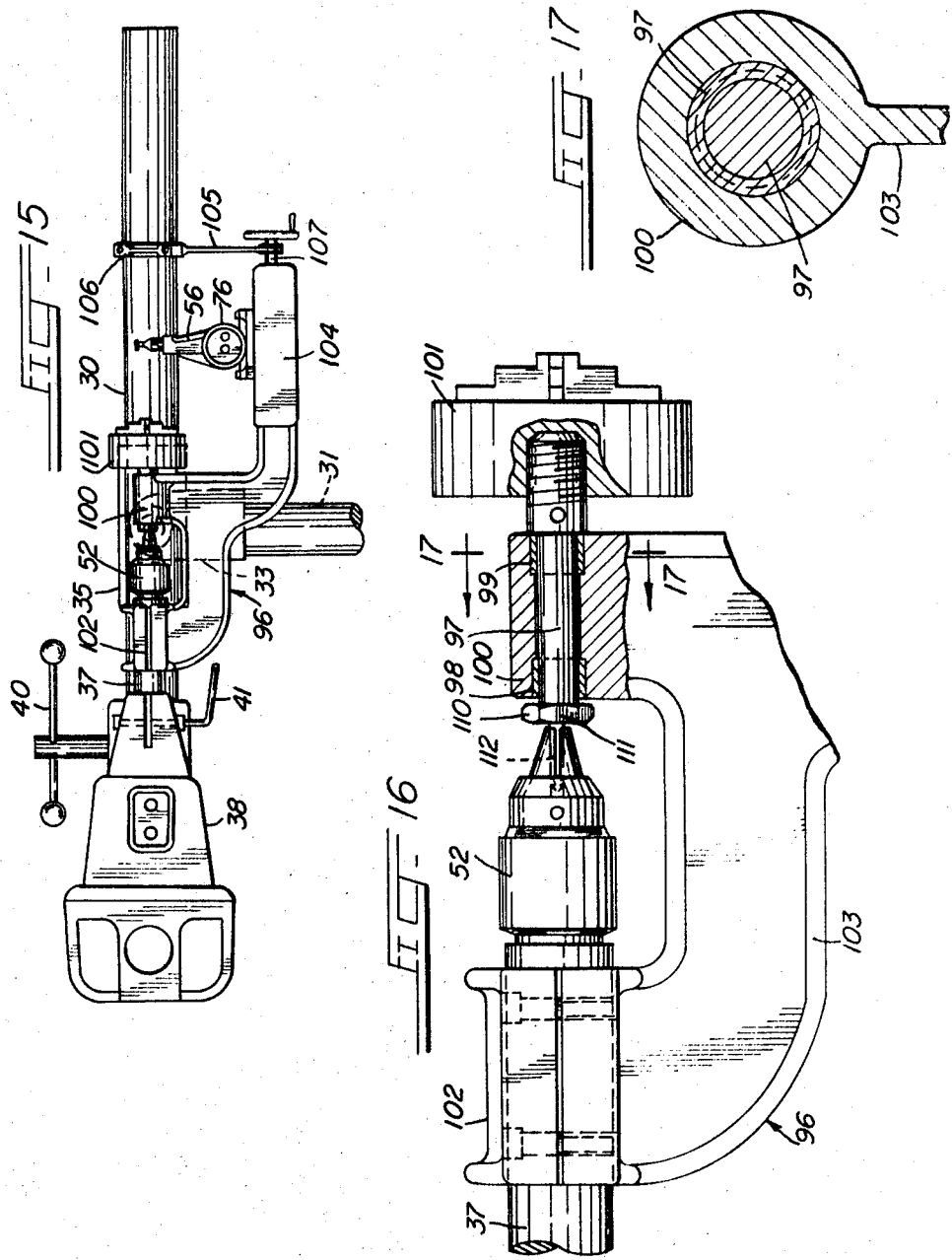

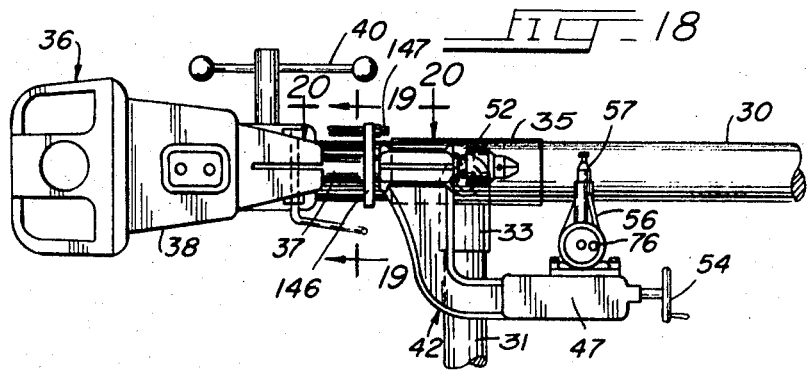
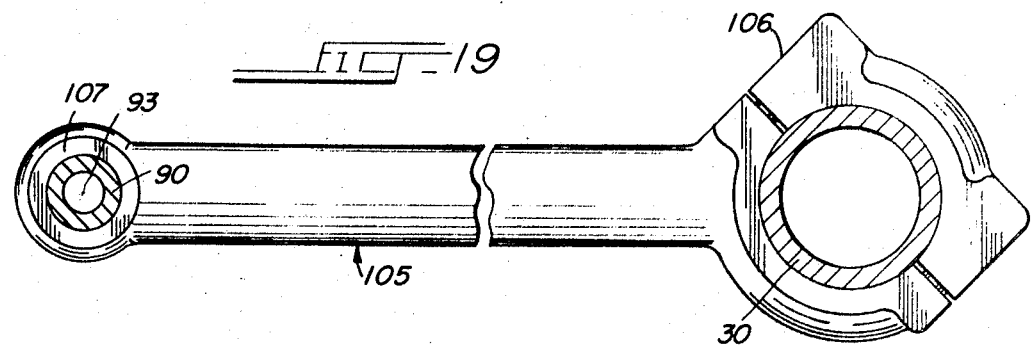
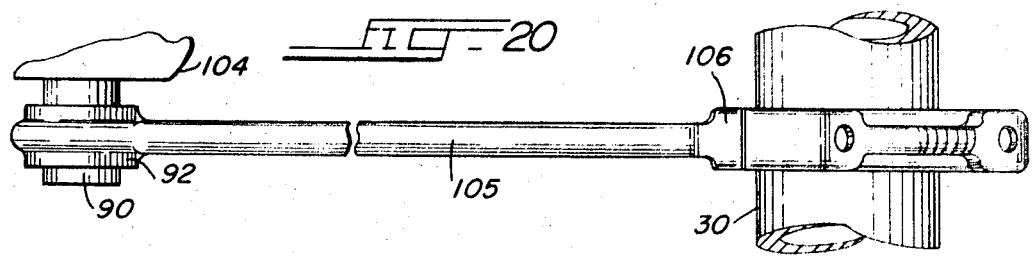
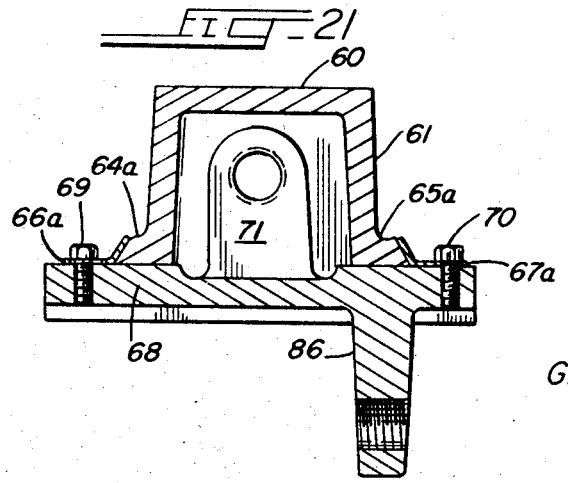
INVENTOR
GLENN B. MORSE

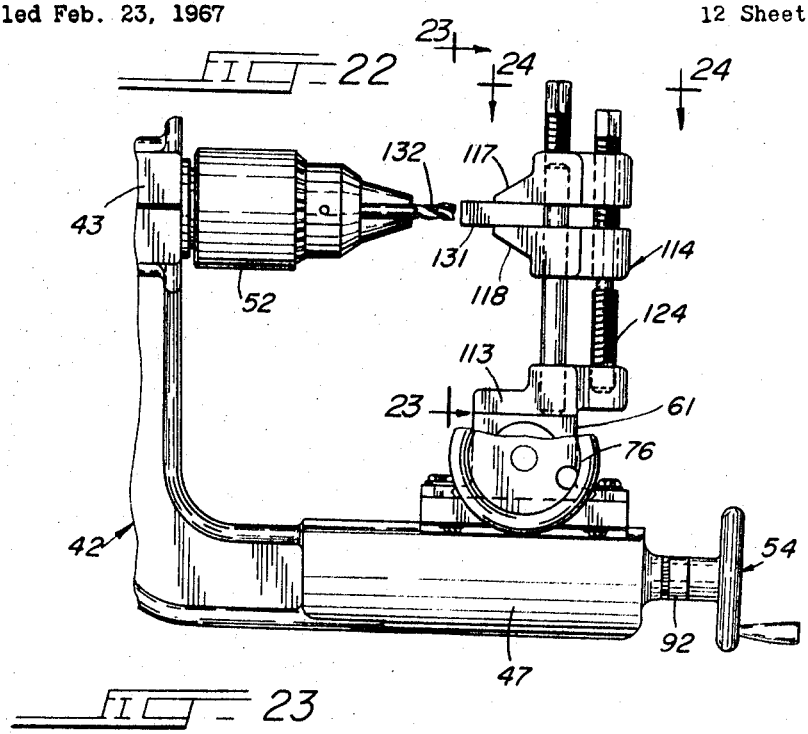
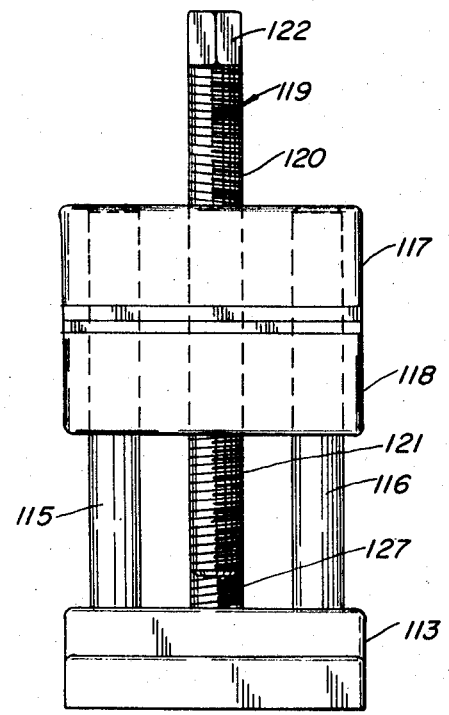
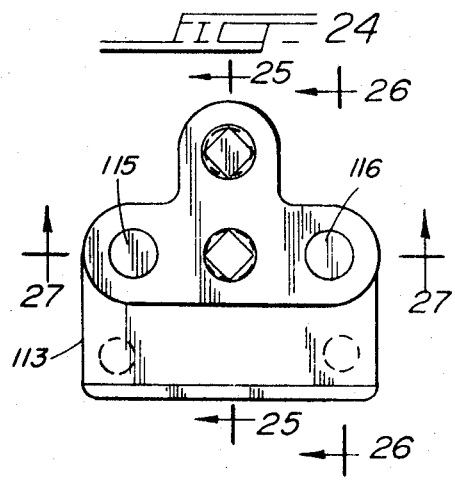
INVENTOR
GLENN B. MORSE

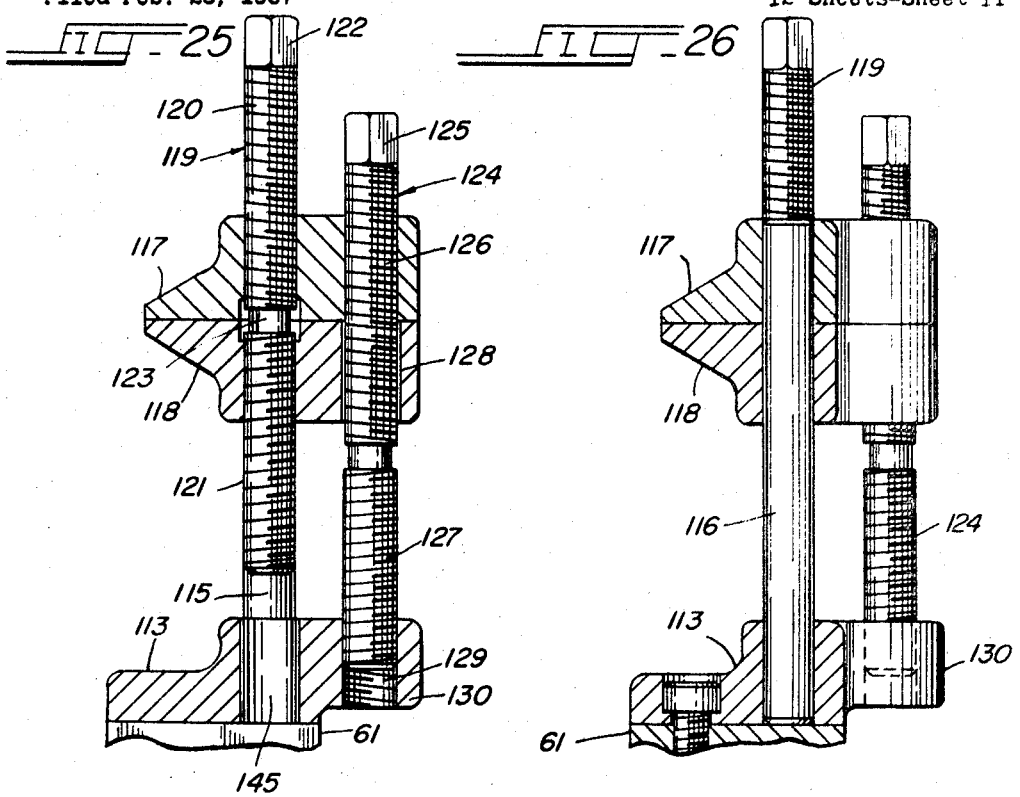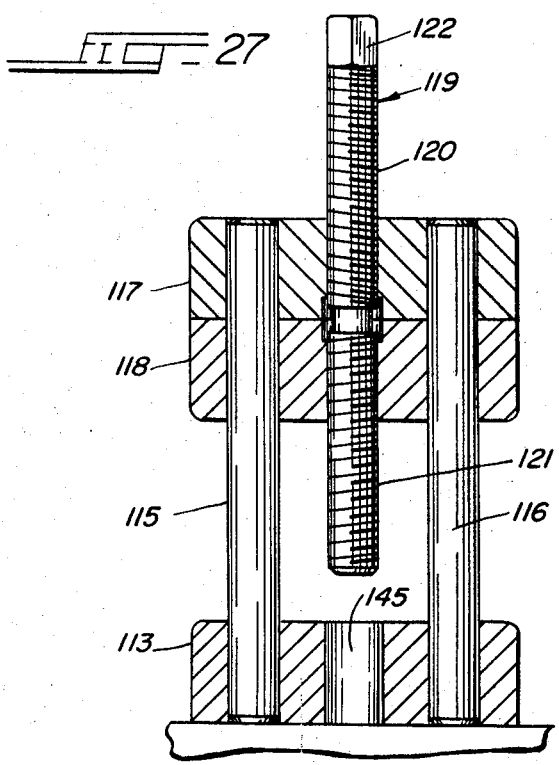

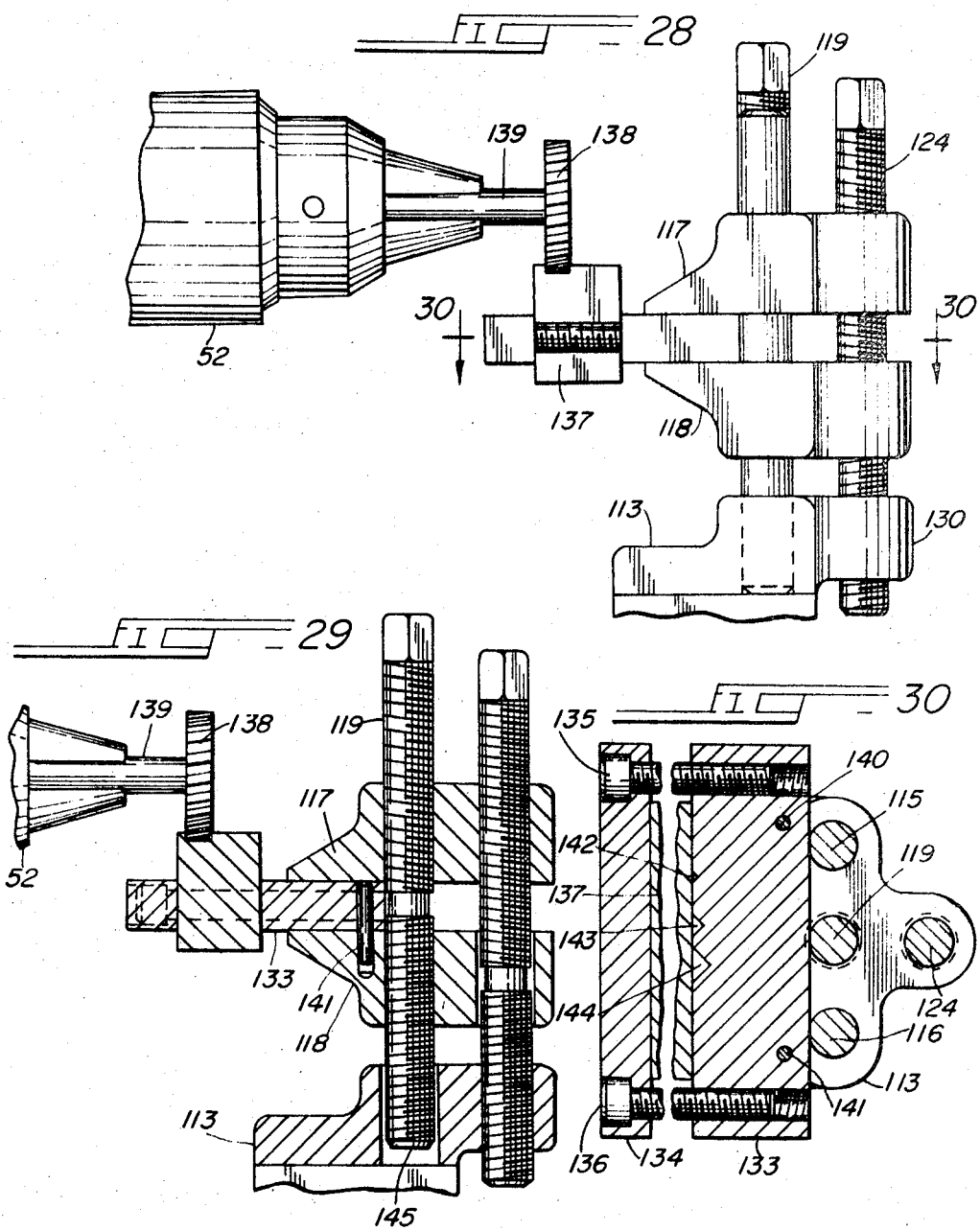

United States Patent Office 3,470,789
Patented Oct. 7, 1969

3,470,789
MULTIPLE PURPOSE MACHINE
Glenn B. Morse, Rte. 3, Grand Rapids, Mich. 49506
Filed Feb. 23, 1967, Ser. No. 618,216
Int. Cl. B23c 7/00
U.S. Cl. 90—11                                        11 Claims

ABSTRACT OF THE DISCLOSURE

A machine having a base machine with a rotative spindle mounted in a nonrotative sleeve secured to a frame, with the sleeve adapted to extend from the frame, and having a machine component supporting a carriage, the component being secured to the sleeve for accurate positioning of the carriage with respect to the spindle axis, and to minimize deflection caused by engagement of a cutting tool with a work piece, the cutting tool and work piece being carried in either order by the spindle and the carriage.

Summary of the invention

This invention provides a multiple purpose machine based upon a standard machine that retains its original utility. In the preferred form of the invention, an ordinary drill press is modified slightly in accordance with my United States Patent 2,963,057, but this is not necessary. The machine component providing the multiple functions is secured to a surface on the base machine which is directly associated with the support of the spindle. In the case of the drill press, the spindle is normally carried by an accurately machined sleeve which is extendable from a bore in the frame. This sleeve is used as a securing point for attaching the machine component.

There are three principal advantages of this system, the first being that exterior surface of the sleeve provides a surface which is located very accurately with respect to the axis of rotation of the spindle, because of the normal arrangement for mounting the spindle bearings in a pressed-fit relationship in the sleeve. In the case of the drill press, the exterior surface of the sleeve is fully machined to provide a reciprocating movement utilized as the "feed" for the drill press spindle. When the spindle is in the position of maximum extension from the bore in the frame, the exposed exterior surface of the spindle is engaged preferably by a clamping device associated with the auxiliary machine component. It is obvious that the accuracy of placement of the machine component with respect to the axis of rotation of the spindle is exceptionally good.

The second advantage arising from this system is that there are a minimum number of interfitting parts between the auxiliary machine component and the spindle, resulting in a corresponding minimum accumulation of tolerances. The auxiliary machine component includes a carriage movable in a direction parallel to the axis of rotation of the spindle, and the spindle and the carriage will carry a cutting tool and a work piece, in either order. Minimizing the accumulation of tolerances in the mounting of the auxiliary component will obviously reduce the freedom of movement of the cutting tool with respect to the work piece, and tend to minimize the objectionable "chatter" associated with loosely-fitted machinery. It should be noted here that this arrangement does not require the machining of any extra surfaces on the standard base machine, nor does it require any closer manufacturing tolerances than are ordinarily provided in the construction of a commercial drill press.

The third significant advantage of this arrangement is the minimizing of deflection which would result in relative movement of a cutting tool with respect to the work piece. Attempts have been made to provide the function of a lathe or milling machine in conjunction with an ordinary drill press by mounting a so-called "milling vise" on the usual table of the drill press. In the first place, it should be noted that there is nothing on the table to automatically align the milling vise with respect to the rotative axis of the spindle, particularly in view of the fact that the table is usually rotatable about the supporting column of the drill press. In addition to this lack of even an approximate alignment, it should be noted that forces generated between the work piece and the cutting tool will induce stresses that are carried through the table, the column, and the power head frame, in addition to the spindle and sleeve. The resilience of this series of interconnected components is sufficient to interfere with the machining operation by inviting the same sort of "chatter" that results from looseness. In fact, resilience often is combined with a looseness arising out of tolerance accumulation to produce a condition in which proper machining is almost impossible.

The carriage of the machine component can support a lathe tool in such a manner as to provide a conventional lathe cut along a work piece held by the usual chuck in the drill press. Alternatively, the lathe tool may be replaced by a milling vise, and the drill press chuck may support a small milling cutter. These two arrangements are illustrative of the wide variety of operations that can be performed with this machine. Essentially, the machining is limited to relatively light-duty operations, but is ideal for the usual home workshop or model-making operations in which a variety of machines are needed, with relatively little floor space to accommodate them. The attachment may be placed off on a shelf out of the way, with a total floor space being that associated with the ordinary drill press.

Detailed description

The several features of the invention will be discussed in detail through a description of the modifications illustrated in the accompanying drawings, in which:

FIGURE 1 is a fragmentary side elevation of a modified drill press incorporating the present invention, with the upper column of the drill press in horizontal position.

FIGURE 2 is a side elevation on an enlarged scale of one modification of the machine component mounted on the sleeve of the drill press.

FIGURE 3 is a section on the plane 3—3 of FIGURE 2.

FIGURE 4 is a section on the plane 4—4 of FIGURE 2.

FIGURE 5 is a section on the plane 5—5 of FIGURE 3.

FIGURE 6 is a top view of the tool post casting.

FIGURE 7 is a top view of the transverse element of the carriage.

FIGURE 8 is a top view of the lower or axially-moving member of the carriage.

FIGURE 9 is a side elevation of the tool post.

FIGURE 10 is a side elevation of the member shown in FIGURE 7.

FIGURE 11 is a side elevation of the member shown in FIGURE 8.

FIGURE 12 is a rear view of the member shown in FIGURE 7.

FIGURE 13 is a front elevation of the member shown in FIGURE 8.

FIGURE 14 is a view on an enlarged scale on the plane 14—14 of FIGURE 2.

FIGURE 15 is a fragmentary side elevation of a modified form of the machine component, shown attached to the same base machine as is illustrated in FIGURE 1.

FIGURE 16 is a fragmentary view on an enlarged scale showing the interengagement of the component shaft with the chuck of the base machine.

FIGURE 17 is a view on the plane 17—17 of FIGURE 16.

FIGURE 18 is a side elevation of a modified manner of installing the machine component shown in FIGURE 1.

FIGURE 19 is a view on an enlarged scale showing the stabilizing strut preferably utilized shown in the FIGURE 15 modification.

FIGURE 20 is a top view of the strut shown in FIGURE 19.

FIGURE 21 shows a modified guideway construction for determining the relative movement between the upper and lower carriage members.

FIGURE 22 is a side elevation showing a milling vise mounted on the carrier of a machine component of the type shown in FIGURE 1, in place of the tool post.

FIGURE 23 is a front elevation, on an enlarged scale, of the milling vise shown in FIGURE 22.

FIGURE 24 is a view on the plane 24—24 of FIGURE 22.

FIGURE 25 is a section on an enlarged scale on the plane 25—25 of FIGURE 24.

FIGURE 26 is a section on the plane 26—26 of FIGURE 24.

FIGURE 27 is a section on the plane 27—27 of FIGURE 24.

FIGURE 28 shows the use of an attachment for the milling vise illustrated in FIGURES 25–27 to convert the position of the clamping action.

FIGURE 29 is a sectional side elevation through the device illustrated in FIGURE 28.

FIGURE 30 is a section on the plane 30—30 of FIGURE 28.

The machine shown in FIGURE 1, and in the related figures, utilizes a base machine of the type described and claimed in my United States Patent No. 2,963,057 issued on Dec. 6, 1960. This base machine is similar in most respects to a conventional drill press, with the exception that the vertical supporting column is divided into an upper section 30 and a lower section 31. The lower end of the column section 31 is fixed with respect to the base 32, and the upper end is fitted with the fulcrum member 33. A pin 34 provides a pivot mounting between the member 33 and the clamp 35 engaging the upper column section 30. The remainder of the features of the pivot joint will not be discussed in detail, as they are not significant to the present invention. The result of the pivot assembly, however, is that the upper column section 30 is rotatable in a vertical plane disposed in front of the lower column section 31, as viewed in FIGURE 1. This arrangement permits the power head assembly 36 to be positioned with the axis of the spindle in any desired relationship to the horizontal. Means (not shown) are preferably incorporated in the pivot assembly for locking or securing the upper column section 30 in any selected position. The column section 30 is also extended to the right of the clamp 35, as shown in FIGURE 1, so that the inclusion of an appropriate balance weight within the hollow tube constituting the column 30 will balance the weight of the power head 36 around the axis of the pin 34.

The use of the jointed column arrangement shown in FIGURE 1 is not absolutely necessary, but the disposition of the power head 36 on a horizontal axis is much more convenient for several of the machining operations made possible by the components provided by the present invention. Either a standard drill press, or a drill press of the type shown in FIGURE 1, will normally be provided with a sleeve 37 slideably mounted, on an axis parallel to the spindle, in the cast frame member 38 of the power head assembly. The spindle 39 is normally supported on the inner race of axially-spaced ball bearings, the outer races of which are in very closely-fitting relationship with the sleeve 37. This form of spindle support is conventional, and the bearings are not shown in the drawings. Ball bearings are not by any means necessary, and it is conceivable that certain types of devices might incorporate sleeve bearings disposed between the spindle 39 and the sleeve 37. In any case, the peripheral surface of the sleeve 37 of a conventional drill press is a carefully machined surface to close tolerances. The axial displacement of the sleeve with respect to the frame 38 is controlled by the handle 40 by a conventional rack and pinion system (not shown) to produce the "feed" movement of the drill press. The sleeve 37 is therefore non-rotative but axially movable with respect to the frame 38. The assembly carried directly by the sleeve 37, and which includes the spindle 39, and the associated bearings, is sometimes referred to as the "quill." It is possible to secure the axial position of the sleeve with respect to the frame 38 through the manipulation of the handle 41, which has the effect of clamping a portion of the frame casting 38 about the periphery of the sleeve 37. It is therefore possible to eliminate all freedom of movement of the sleeve 37 with respect to the frame 38 by tightening the handle 41. In preparing the base machine for receiving the machine components provided by this invention, it is preferable that the sleeve be run to the fully extended position shown in FIGURE 1 by manipulation of the handle 40, followed by tightening the handle 41 with the sleeve in this extended position. A considerable axial length of the sleeve is therefore made available for functioning as a securing point for receiving the machine components. The component 42 has a clamping portion 43 formed by the cap 44 and the upper extremity of the arm 45. The cap is secured by a pair of bolts disposed on opposite sides of the device, two of which are indicated at 46 in FIGURE 2. The arm 45 extends between the clamping portion 43 and the guideway section indicated generally at 47. This is preferably of a trough-shaped configuration, and is best shown in FIGURE 4. The top surface 48 forms a guideway for the carriage assembly 49, and the guide surface 48 is preferably divided into parallel sections disposed on opposite sides of the axis of the spindle 39, spaced apart sufficiently so that the width of the arm 45 does not interfere with machining operations for producing the surface 48, as it may be desirable to produce these surfaces by movement of milling cutters or grinding wheels in a direction from right to left, as shown in FIGURE 2. Because of the coplanar relationship of the opposite sides of the surface 48, this surface may also be produced by cutting operations moving front to rear, as shown in FIGURE 2 (transversely with respect to the axis of the spindle 39). The transverse edge of the trough section 47 at the left extremity of the surface 48, in the area indicated at 50, may be recessed for clearance to eliminate machining problems, in the event that the surface 48 is produced by the right-left movement of manufacturing equipment. The same is true of the portion 51 at the opposite end of the trough 47.

The guideway defined by the surface 48 thus forms a base for the movement of the carriage assembly 49, which can support tools or work pieces for operations to be performed in conjunction with tools or work pieces held in the conventional chuck 52 carried by the spindle 39. For example, the arrangement shown in FIGURE 2 shows the chuck 52 in position to hold a small diameter rod (the usual intermediate size drill press chuck will hold a rod up to ½ inch in diameter), and the carriage 49 provides a support for a lathe tool 53. Movement of the carriage 49 to the left, by manipulation of the handle wheel 54 will therefore move the lathe tool 53 in a direction to remove a shaving from the surface of a rod held by the chuck 52.

The lathe tool 53 is clamped to the top surface of a rocker 55 resting on the concave conical surface defining the top of the tool posts 56. A bolt 57 is provided with a transverse central recess for receiving the tool 53 and the rocker 55, and also with an axially threaded hole for the clamping screw 58. Tightening of the screw 58 will therefore deliver a force on the top of the tool 53 which is transmitted to the rocker 55, and to the top surface of the tool post 56. This force is resisted by the threaded engagement of the bolt 57 with the post 56, and it will be noted that this arrangement provides not only for rotary adjustability of the tool 53 upon the axis of the bolt 57, but also for a very simple assembly operation.

The base 59 of the tool post 56 is mounted on the top surface 60 of the transverse carriage member 61 by screws as shown at 62 and 63. The base flanges 64 and 65 of the carriage member 61 are preferably V-shaped as best shown in FIGURE 5, and are received by oppositely shaped edges of the guideway strips 66 and 67, respectively, secured to the lower carriage member 68 by bolts as shown at 69 and 70 in FIGURE 5. The lower carriage member 68 has a central abutment 71 provided with a threaded hole for receiving the transverse feed screw 72. This screw is axially fixed with respect to the carriage member 61 by the combined effect of the shoulder 73 and the set screw 74 in the hub 75 of the handle wheel 76. Preferably, an indicating ring 77 is received on an unthreaded portion 78 of the screw 72, so that a set screw 79 can determine the angular relationship of the ring 77 with respect to the screw 72, and thus bring into registry suitable markings on the periphery of the ring 77 with respect to a reference point on the carriage member 61. Rotation of the handle 76 will therefore cause the carriage to move transversely with respect to the axis of the chuck 52, and thus control the degree of penetration of the tool 53 into a work piece carried by the chuck.

The spaced parallel top surfaces 68a and 68b of the lower carriage member 68 are easily machined in a flat plane, and the strips 66 and 67 are very easily manufactured. If a limited degree of looseness is provided in the holes in the strips 66 and 67 receiving the bolts 69 and 70, it will be possible to adjust the amount of freedom of the transverse carriage member 61 with respect to the remainder of the machine. Tightening of the bolts 69 and 70 while applying slight pressure toward the carriage member 61 will usually provide the proper interfitting relationship.

The bottom surfaces 68c and 68d of the member 68 are received on the guideway surfaces 48 of the trough structure 47, and the carriage assembly is laterally positioned with respect to this structure by the presence of the angular strips 80 and 81 (see FIGURE 4) secured to the carriage member 68 by bolts as shown at 82 and 83 so that the strips engage the beveled surfaces 84 and 85 on the top flanges of the trough structure 47. The carriage member 68 has a depending abutment 86 in threaded engagement with the feed screw 87, which is axially fixed with respect to the end 88 by the combined effect of a shoulder 89 and the set screw 90 in the hub 91 of the handle wheel 54. An indicating ring 92 is also preferably incorporated in this portion of the assembly. The securing of the ring rotatively with respect to the unthreaded portion 93 of the screw 87 by the set screw 94 will bring indicia on the periphery of the ring 92 into cooperating relationship with a reference point on the boss 95, so that the movement of the carriage assembly 49 parallel to the axis of the chuck 52 (from left to right, as shown in FIGURES 2 and 5) can be controlled accurately.

FIGURE 21 illustrates an alternative guideway arrangement to that shown in FIGURE 3 at the junction of the lower carriage member 68 and the supporting surface 48. The flanges 64a and 65a of the upper carriage member 61 are beveled to receive the inclined portion of the steel strips 66a and 67a which are secured by the bolts 69 and 70. It is preferably that the conformation of the strips 66a and 67a be such that tightening of the bolts 69 and 70 will generate a small amount of deflection to provide a resilient confinement for the carriage member 61. The arrangements shown in FIGURES 5 and 21 may be considered as alternate; but it will usually be somewhat less expensive to use the steel strip guideway members, rather than the conformation shown in FIGURE 5.

Referring to FIGURES 15 through 17, a modified machine component 96 is shown installed on a drill press similar to that shown in FIGURE 1. The principal point of difference between the modification 96 and that illustrated in FIGURE 1 is the provision of an independent shaft 97 supported in the bearings 98 and 99 on the central portion 100. This shaft is preferably provided with a conventional 3-jaw chuck 101, and the purpose of this arrangement is to keep the loading resulting from the cutting operations isolated from the spindle structure of the base machine. The component 96 has a clamping arrangement 102 similar to that previously described, which engages the sleeve 37 in the same manner, and is axially spaced from the central portion 100. The arm 103 extends from this clamping portion to the guideway unit indicated at 104, which serves the same function as the structure 47 previously described.

In view of the length of the component 96, it is often desirable to utilize a stabilizing strut 105 extending between the clamp 106 engaging the upper column section 30 over to an extension on the boss 107 at the end of the guideway structure 104. Tightening the clamping arrangement 106 will serve to stabilize the right end of the component 96 against vibration. This arrangement, together with the torsional rigidity of the trough shaped section 104, and the I-shaped section of the arm 103, will normally result in acceptable machining characteristics. Chips that may fall from the area of the cutting operation into the trough structures may be cleaned out by providing openings in the bottom of the trough structures as shown at 108 and 109 in FIGURE 5.

The shaft 97 may be permanently secured to the component 96 by the provision of a nut 110 on the threaded portion 111 of the shaft 97. The extension 112 of slightly reduced diameter, is then engaged by the chuck 52. Alternatively, the nut 110 may be omitted, and the subassembly including the shaft 97 and the large chuck 101 may be left disengaged until the unit 96 has been installed on the sleeve 37. After the clamping unit 102 has been secured, the shaft may then be slipped into the central structure 100 and the chuck tightened in driving position on the extension 112. It should be noted that this arrangement limits the function of the spindle of base machine to the transfer of torque to the shaft 97, and relieves it from the side stresses from the machining operations.

FIGURES 22 through 30 illustrate the installations and structural details of a milling vise that can be used in conjunction with the machine component shown in FIGURE 2, in place of the tool post 56. The base 113 of the vise assembly 114 is secured to the top surface 60 of the carriage member 61 by bolts disposed in the same location as the bolts that secure the tool post 56. The guide rods 115 and 116 are fixed with respect to the base 113, normally by a press-fit. The upper and lower jaw members 117 and 118, respectively, are slideably mounted on the rods 115 and 116. The clamping screw 119 has the upper end 120 threaded in opposite hand to the threading of the lower portion 121. A squared top 122 provides for the engagement of a suitable wrench to manipulate the screw 119. Preferably, the upper and lower threaded portions are separated by a portion 123 of reduced diameter to avoid interference or distortion of the threads, and to facilitate a rolled thread operation. Rotation of the screw 119 will therefore move the jaws 117 and 118 either apart or together, depending upon the direction of rotation.

The screw 120 will move with the jaws as the jaw assembly is adjusted as a unit by the screw 124, which is responsible for the vertical placement of the jaws. The screw 124 also has a squared head 125 for receiving a wrench, and has upper and lower threaded portions 126 and 127 of opposite hand. The portion 126 is in threaded engagement with the upper jaw 117, but moves within a clearance hole 128 in the lower jaw 118. The lower threaded portion 127, however, is in threaded engagement with the hole 129 in the overhanging portion 130 that extends beyond the top surface 60 of the carriage member 61. A piece of material may be clamped in the jaws 117 and 118 by manipulation of the screw 119, and then the entire unit may be adjusted vertically by manipulating the screw 124. The overhang of the portion 130 permits the screw 124 to move downward past the carriage member 61 as the unit is lowered. A piece of material indicated at 131 in FIGURE 22 may therefore be brought into operating engagement with the milling cutter 132 held in the chuck 52. The vertical feed or adjustment will be accomplished by the screw 124, the transverse movement will be controlled by the wheel 76, and the axial movement (with respect to the milling cutter 132) will be controlled by the hand wheel 54.

It often becomes desirable to use a wheel-type cutter such as a slotting saw or abrasive drum, and it is usually desirable to change the orientation of the clamping action for such operation. FIGURES 28, 29 and 30 show an arrangement for accomplishing this. The block 133 is placed between the jaws 117 and 118 and the space between the block 133 and the bar 134 is disposed beyond the ends of the jaws 117 and 118. Tightening the bolts 135 and 136 will clamp a work piece 137 in a position where it can be conveniently brought into engagement with the cutting saw 138 carried on the end of the arbor 139. The arbor is gripped by the chuck 52, and the vertical, transverse, and axial feeds are controlled in the same manner as previously described. Pins can be incorporated as shown at 140 and 141 to fix the position of the block 133 with respect to the jaws in a manner more positive than can be obtained by mere clamping action. In view of the fact that this mechanism is preferably a very low-cost device, it often results that the clamping surfaces of the jaws are not exactly parallel. The presence of the pins 140 and 141 provides for a secure positioning of the auxiliary clamp composed of the block 133 and the bar 134, and the pins are preferably in a press-fit engagement with the block 133, with a corresponding relatively looser slip fit in holes in the jaw 118. Alternatively, the pins 141 can be press-fit into the jaw 118 with looser engagement in the block 133, and with clearance holes opposite these pins in the upper jaw 117. In either case, the block 133 is engaged by opening the jaws 117 and 118 sufficiently to accommodate the width of the block plus the projection of the pins.

The height of the milling vise shown in FIGURES 22 through 30 is the principal element responsible for the offset formation of the arm 45 of the machine component 42. It is desirable that a considerable range of vertical movement be provided for blocks of material grasped between the jaws 117 and 118, in addition to the possible width of work pieces. Whatever the resulting height may be when the milling vise is designed to suit specific requirements, that height forms a design requirement between the top surface 60 of the carriage member 61 and the axis of rotation of the chuck 52. This is the factor responsible for the rather extended height of the tool post 56, which must fill this gap to position the lathe tool 53 opposite the axis of rotation of the chuck 52.

It is often desirable to secure rods with the auxiliary clamping units shown in FIGURES 28 through 30 in an absolutely vertical position, and prevent slippage sideways under the forces generated by the cutting tool 138. A typical example of an operation where this would be required would be in slotting the end of a rod or screw head, which is an operation very commonly performed by model makers and workmen machining small parts. A rod or screw blank can be placed in one of the notches 142–144 in the block 133, and tightening of the screws 135 and 136 will hold the work piece rigidly in position. To give maximum freedom of vertical movement of the jaws 117 and 118, it is desirable to provide a clearance hole 145 in the base 113 to admit the lower end of the clamping screw 119. A similar hole may be placed in the top of the carriage 61. All of these structural features are designed in such a manner as to keep the forces generated during the machining operations in as compact a structure as possible to minimize bending deflection and vibration, and to facilitate die-casing procedures.

FIGURE 18 illustrates a modified position of installation of the machine component 42. A conventional drill press is provided with a depth gauge which includes a collar 146 clamped around the sleeve 37. An indicator rod 147 is secured to the collar 146, and is provided with the usual indicia (not shown) which registers in conjunction with a suitable point on the frame 38 to indicate the degree of extension of the sleeve 37. Normally the collar 146 is secured to the lower extremity of the sleeve 37. There are three alternatives that may be followed with regard to the installation of the component 42. One of these is shown in FIGURE 1, in which the depth indicator assembly is removed entirely. FIGURE 18 illustrates another possibility, which is the axial displacement of the collar 146 to the left to a sufficient amount to permit the component 42 to engage the sleeve. The outside diameter of the sleeve 37 is normally slightly in excess of that of the standard chuck 52, which permits the clamping portion 43 to be slipped over the chuck to the installed position. Such an arrangement would require only the slotting of the clamping portion 43 on one side, rather than the arrangement involving the separable cap 44. The third possibility for installing the component 42 is to leave the collar 146 in the normal installed position adjacent the lower (right hand, as shown in FIGURE 18) position, with the clamping portion 43 disposed between the collar 146 and the lower extremity of the frame 38. This requires separation of the cap 44, which is then disposed between the sleeve 37 and the rod 147.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a base machine having a frame, a sleeve mounted on said frame and rotatively fixed with respect thereto, said sleeve being disposable in a position extending axially from adjacent portions of said frame, a spindle rotatively mounted in said sleeve, and drive means for said spindle,
   a machine component having a portion normally engaging said sleeve to fix the position of said component with respect to the axis of said spindle, said component being thereby supported by said base machine, one of said spindle and said component normally having a work piece holding means and the other normally having cutting tool holding means.

2. A combination as defined in claim 1, wherein said sleeve is cylindrical and is mounted in a bore in said frame.

3. A combination as defined in claim 2, wherein said sleeve is axially reciprocably mounted in said bore for movement from a retracted position to a position extended to receive said component.

4. A combination as defined in claim 3, wherein said base machine is a drill press.

5. A combination as defined in claim 1, wherein said machine component has a guideway substantially parallel to said axis and a carriage mounted in said guideway.

6. A combination as defined in claim 5, wherein said guideway is offset from said axis.

7. A combination as defined in claim 5, wherein said guideway has spaced portions disposed on opposite sides of said axis, and said component has a coupling portion engaging said sleeve, and a connecting portion extending between said coupling portion and said guideway, said spaced guideway portions being separated by a distance in excess of the width of said connecting portion.

8. A combination as defined in claim 7, wherein said spaced guideway portions are interconnected by a trough portion.

9. A combination as defined in claim 5, wherein said guideway is defined by coplanar surfaces on said component, together with means separable from and normally secured to said surfaces.

10. A combination as defined in claim 5, wherein said component has bearing means coaxial with and spaced from said sleeve-engaging portion, and a shaft having one end normally disposed in the space between said bearing means and sleeve-engaging portion, and the opposite end having means to engage a chuck device.

11. A combination as defined in claim 1, wherein said base machine includes a column extending parallel to the axis of said spindle and said component includes a strut extending therefrom and detachably secured to said column.

References Cited

UNITED STATES PATENTS

| 1,618,358 | 2/1927 | Thompson | 29—27.1 |
| 2,114,926 | 4/1938 | Kneff | 82—1.3 |
| 2,783,671 | 3/1957 | Cushion | 82—1.3 X |

FOREIGN PATENTS

| 876,792 | 5/1953 | Germany. |

ANDREW R. JUHASZ, Primary Examiner

G. WEIDENFELD, Assistant Examiner

U.S. Cl. X.R.

29—27, 560; 82—1; 144—1